(12) United States Patent
Bishop et al.

(10) Patent No.: US 11,756,006 B2
(45) Date of Patent: Sep. 12, 2023

(54) AIRPORT PAVEMENT CONDITION ASSESSMENT METHODS AND APPARATUSES

(71) Applicant: Bye UAS LLC, Albuquerque, NM (US)

(72) Inventors: Grant Bishop, Oakton, VA (US); Valerie Saur, Lees Summit, MO (US); Shihlin Lu, Reston, VA (US); Michael Fuller, Albuquerque, NM (US); Juan Naputi, Reston, VA (US); Christopher Davis Smith, Salem, VA (US); Kevin Sasso, Columbia, MD (US); April Kim, Baltimore, MD (US); Daniel Serna, Albuquerque, NM (US)

(73) Assignee: BYE UAS LLC, Albuquerque, NM (US)

( * ) Notice: Subject to any disclaimer, the term of this patent is extended or adjusted under 35 U.S.C. 154(b) by 268 days.

(21) Appl. No.: 17/307,792

(22) Filed: May 4, 2021

(65) Prior Publication Data

US 2021/0350524 A1 Nov. 11, 2021

Related U.S. Application Data

(60) Provisional application No. 63/021,433, filed on May 7, 2020.

(51) Int. Cl.
*G06Q 10/20* (2023.01)
*G06T 7/00* (2017.01)
(Continued)

(52) U.S. Cl.
CPC ........... *G06Q 10/20* (2013.01); *B64C 39/024* (2013.01); *G06F 18/2431* (2023.01); *G06N 3/08* (2013.01); *G06T 7/0004* (2013.01); *G06V 10/75* (2022.01); *G06V 20/17* (2022.01); *G06V 20/182* (2022.01); *B64U 2101/30* (2023.01);
(Continued)

(58) Field of Classification Search
CPC ... G06Q 10/20; B64C 39/024; G06F 18/2431; G06N 3/08; G06N 3/045; G06T 7/0004; G06T 2200/32; G06T 2207/10032; G06T 2207/30184; G06T 2207/10048; G06T 7/001; G06T 2207/20021; G06T 2207/20081; G06T 2207/20084;
(Continued)

(56) References Cited

FOREIGN PATENT DOCUMENTS

| CN | 107728119 | * | 2/2018 | ............... G01S 7/38 |
| CN | 109255288 | * | 1/2019 | ........... G06V 20/176 |

(Continued)

*Primary Examiner* — Jerome Grant, II
(74) *Attorney, Agent, or Firm* — V Gerald Grafe (57) ABSTRACT

An example embodiment of the present invention provides a method of assessing the condition of a pavement site, comprising: (a) acquiring aerial images of the site from above, for example by an unmanned aerial system (UAS); (b) using photogrammetry tools to generate an orthomosaic that represents the airport pavement surface; (c) using image analysis tools and machine learning methods to determine the location and extent of defects in the pavement; (c) producing an image representation of the site and the defects, where the location and extent of defects are discernible from the image; (d) using software application techniques to store and present defect data and other related information for client-side user access.

8 Claims, 7 Drawing Sheets

(51) Int. Cl.
  *G06N 3/08* (2023.01)
  *B64C 39/02* (2023.01)
  *G06V 20/10* (2022.01)
  *G06F 18/2431* (2023.01)
  *G06V 10/75* (2022.01)
  *G06V 20/17* (2022.01)
  *B64U 101/30* (2023.01)

(52) U.S. Cl.
  CPC ............ *G06T 2200/32* (2013.01); *G06T 2207/10032* (2013.01); *G06T 2207/30184* (2013.01)

(58) Field of Classification Search
  CPC ...... G06V 10/75; G06V 20/17; G06V 20/182; B64U 2101/30
  USPC ........................................... 382/141
  See application file for complete search history.

(56) References Cited

FOREIGN PATENT DOCUMENTS

| CN | 110910354 | * | 3/2020 | ............ G06T 7/0002 |
| KR | 20170126148 | * | 11/2017 | |
| KR | 20200009726 | * | 6/2020 | ............. G01N 21/31 |

* cited by examiner

AIRPORT PAVEMENT CONDITION ASSESSMENT METHODS AND APPARATUSES

BACKGROUND

Field of the Invention

The subject invention relates to assessment of the condition of pavement, more specifically to one or more of: assessing the condition of pavement such as airport runways, predicting future condition of such pavement, and defining cost-effective maintenance and repair of such pavement.

Description of Related Art

Current airport Pavement Management Programs (PMP) involve manual inspection of pavement, with ad hoc photographs and an overall estimate of the average pavement condition index (PCI). The average PCI is used to determine timing and scope of pavement maintenance, repair, and replacement. Assessment of Airport PCI is commonly performed according to ASTM D5340, Standard Test Method for Airport Pavement Condition Index Surveys, incorporated herein by reference. Airport PCI surveys, e.g., those for the Department of Transportation in many US states, are stored and visualized in digital software application systems such as Applied Pavement Technology IDEAs (Interactive Data Exchange Applications), FAA PAVEAIR, and PAVER.

Use of average PCI means that portions of the pavement will be above, and portions below, the average. Accordingly, portions of the pavement may be in worse condition than allowed by the threshold PCI, leading to further or accelerated pavement deterioration and accidents in flight conditions. Manual inspection gives an overall assessment but does not provide for tracking and prediction of individual defects or condition of small portions of the pavement. Conventional approaches thus allow pavement to deteriorate below desired thresholds, while also requiring more extensive repairs (e.g., an entire runway may be resurfaced when only a small portion is damaged).

There is a need for methods and apparatuses that provide one or more of the following: facilitate frequent monitoring of pavement, detection and tracking of defects over small areas including localized pavement detail rather than aggregate assessment by a single average parameter; assessment of the total pavement surface area rather than extrapolation from subset samples; registration of results across multiple inspections; full traceability of assessment to quantitative determinations rather than subject evaluations; and integrated presentation of detailed results to allow informed, cost-effective maintenance and repair operations.

DESCRIPTION OF THE INVENTION

An example embodiment of the present invention provides a method of assessing the condition of a pavement site, comprising: (a) acquiring aerial images of the site from above, for example by an unmanned aerial system (UAS); (b) using photogrammetry tools to generate an orthomosaic that represents the airport pavement surface; (c) using image analysis tools to determine the location and extent of defects in the pavement; (c) producing an image representation of the site and the defects, where the location and extent of defects are discernible from the image. Example embodiments geo-synchronize the acquired images with other site images, e.g., satellite images such as in common mapping software, and present an image representation showing pavement condition (determined from the acquired images) overlaid on conventional site maps (from other image sources). Example embodiments determine PCI values for an airport pavement network, branch, and section as defined in the FAA Advisory Circular 150-5380-7B. Example embodiments produce an image representation in the form of a Heatmap, where color, brightness, or another characteristic of the image readily discerned by a human user is varied in the image representative of the condition of the pavement at that portion of the image; e.g., bright red indicating the poorest condition (equivalent to PCI values between 0-40) to dark green indicating the best condition (equivalent to PCI values between 91-100). The ASTM D5340 standard contains the official PCI color scale which indicates different categories of PCI conditions, ranging from 0-100 across 7 different colors. Example embodiments produce an image representation in the form of an Enhanced Distress Layer (EDL), where characteristics of defects in the pavement such as width, length, or texture of an identified distress class are visualized so that they are discerned by a human user. Example embodiments determine a maintenance or repair suggestion for specific regions of the airport based on PCI in network, branches, or sections of interest, e.g., divisions of PCI networks, branches and sections—as well as Critical PCI—are pre-determined by State Department of Transportation (DOT) engineers and then determining a corresponding maintenance or repair action likely that will improve the PCI of that section to acceptable values.

Example embodiments store the acquired image, defect determinations, or a combination or derivative thereof, determined at a first time, and produce defect determinations at a second time, and present comparisons between the two in a resulting image or image sequence. The comparisons can be used to monitor condition of the pavement over time, e.g., the embodiment can determine regions of the airport area of interest where the pavement condition deteriorated at a faster rate than other areas or can determine an overall rate of deterioration. The rate(s) determined can be used to assess the efficacy of previous maintenance and repair operations, and can be used to predict future conditions, and can be included in determination of recommended maintenance and repair operations, e.g., by recommending more extensive or earlier repairs in regions that exhibited more rapid deterioration.

In an example embodiment, raw georeferenced imagery (on the order of approximately 0.29 to 1 cm per pixel GSD) is first stitched into an orthomosaic using structure from motion techniques. The orthomosaic is then divided into sections according to the facility's existing pavement type or organizational/maintenance divisions. Next, the section images are downsized, and non-pavement elements are removed. The imagery of each pavement section is scanned for defects using computer vision techniques and machine learning algorithms. The algorithms are pretrained on examples of pavement defects and thus are able to identify different classes of visible defects in the pavement. For each defect class present, the location and severity of individual instances are recorded into a raw data file, as well as the total surface area of the defect class. This information is then used to calculate an average PCI for the section and recorded into a separate raw data file that contains the PCI for each pavement section. After the defects have been identified and PCI values calculated, an Enhanced Distress Image is generated for each pavement section. An automated distress generation algorithm is applied to each section image, which results in creating colored boundaries around each defect. These boundaries enhance all defects so that the user can better distinguish the pavement defects. Next, the imagery of each pavement section is rasterized and each pixel is assigned a brightness and HEX color value according to the condition of the pavement it represents. An automated heatmap generation algorithm is applied according to the ASTM D5340 PCI color table. The resulting imagery can be exaggerated using the color scale as defined in the ASTM D5340 Standard such that it transforms the individual PCI section images into heatmap images. After the Enhanced Distress Image and Heatmaps are generated for each section, they can be produced into two overall orthomosaic images. The heatmap images, enhanced distress images, raw section images, and raw PCI data can be exported into a suitable file format, which can be then uploaded to web-based software application databases. Users can then view all associated PCI data, imagery, and analyses within the application.

Embodiments can work with the 33 defect types described in the ASTM D5340 standard, and the methods of measurement indicated in the standard.

BRIEF DESCRIPTION OF THE DRAWINGS

The following drawings and the associated descriptions below represent example embodiments.

MODES FOR CARRYING OUT THE INVENTION AND INDUSTRIAL APPLICABILITY

Figure 1:
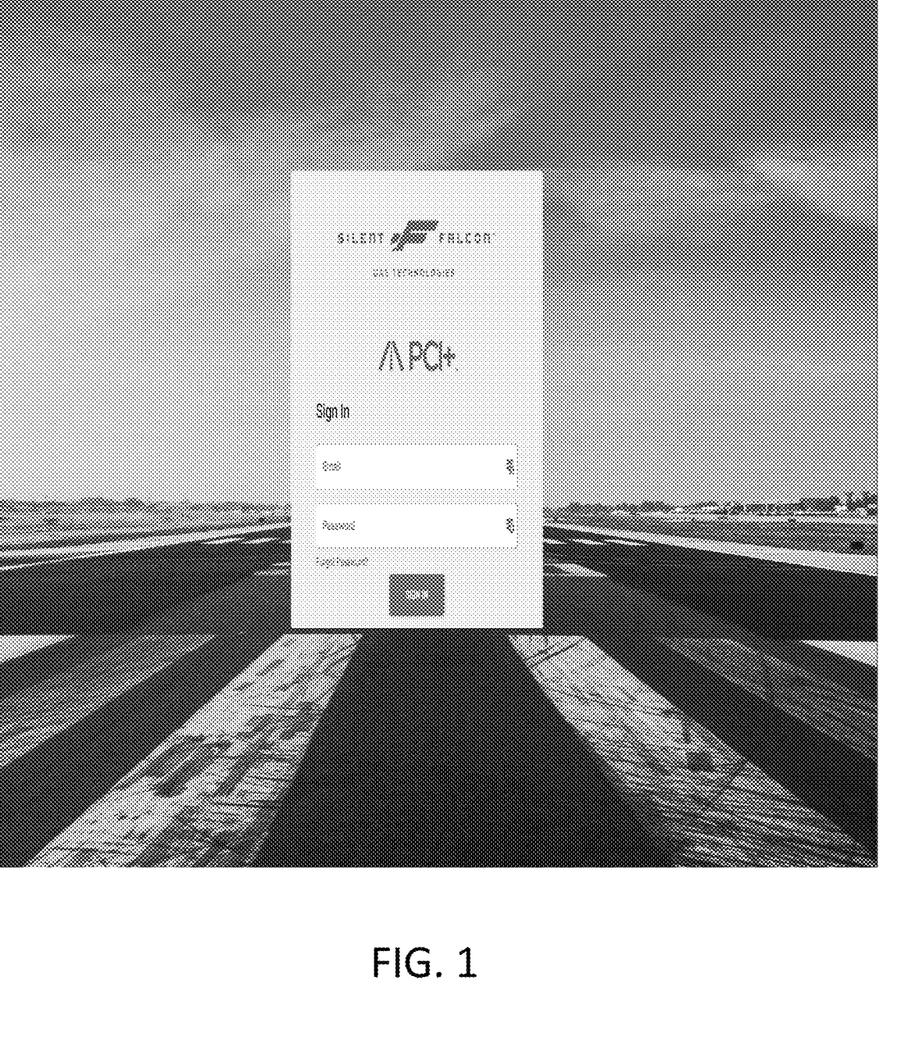
FIG. 1 is an illustration of an example PCI web application login screen according to the present invention.
Figure 2:
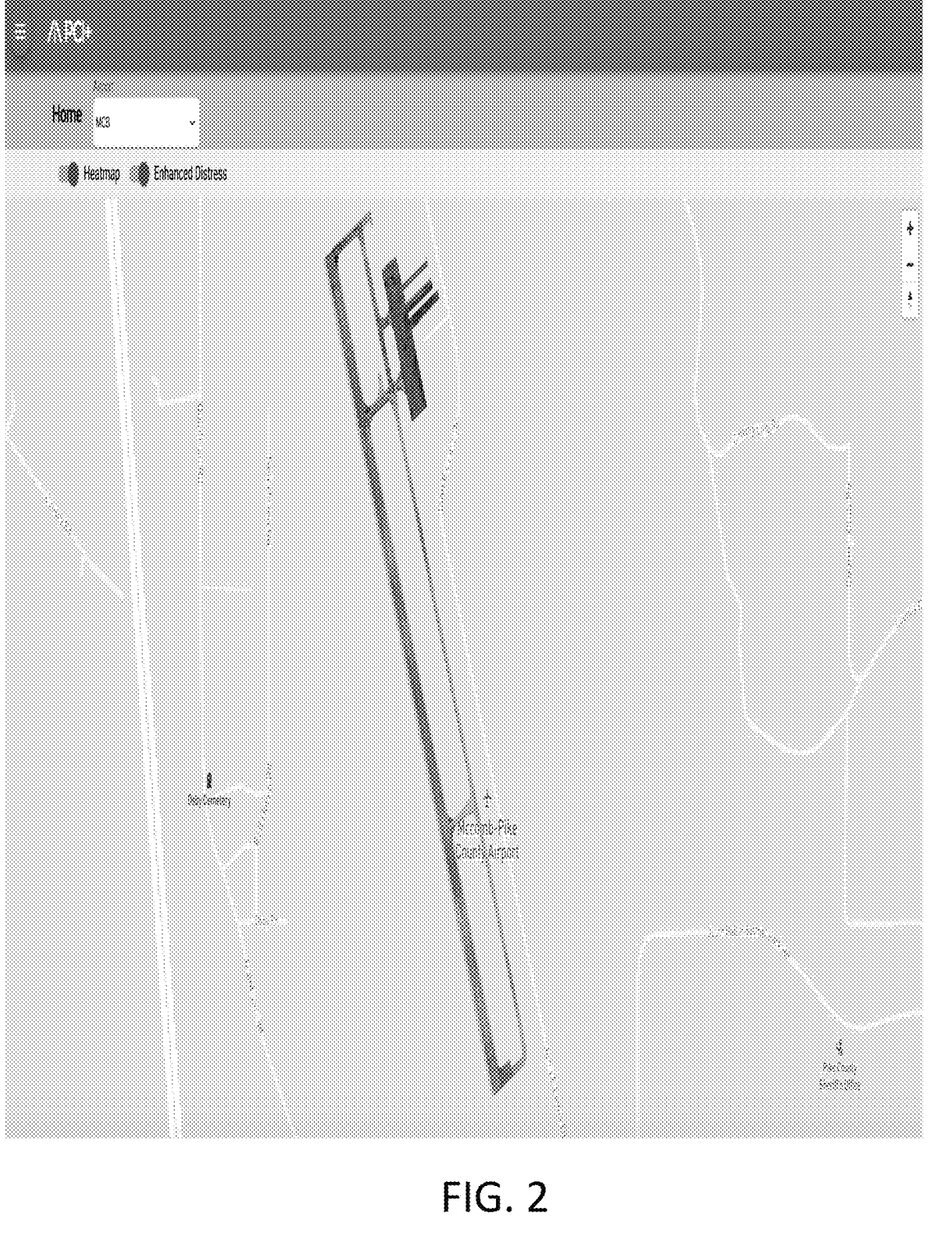
FIG. 2 is an illustration of an example Pavement Condition Index (PCI) image produced by example embodiment and placed into a software application dashboard.
Figure 3:
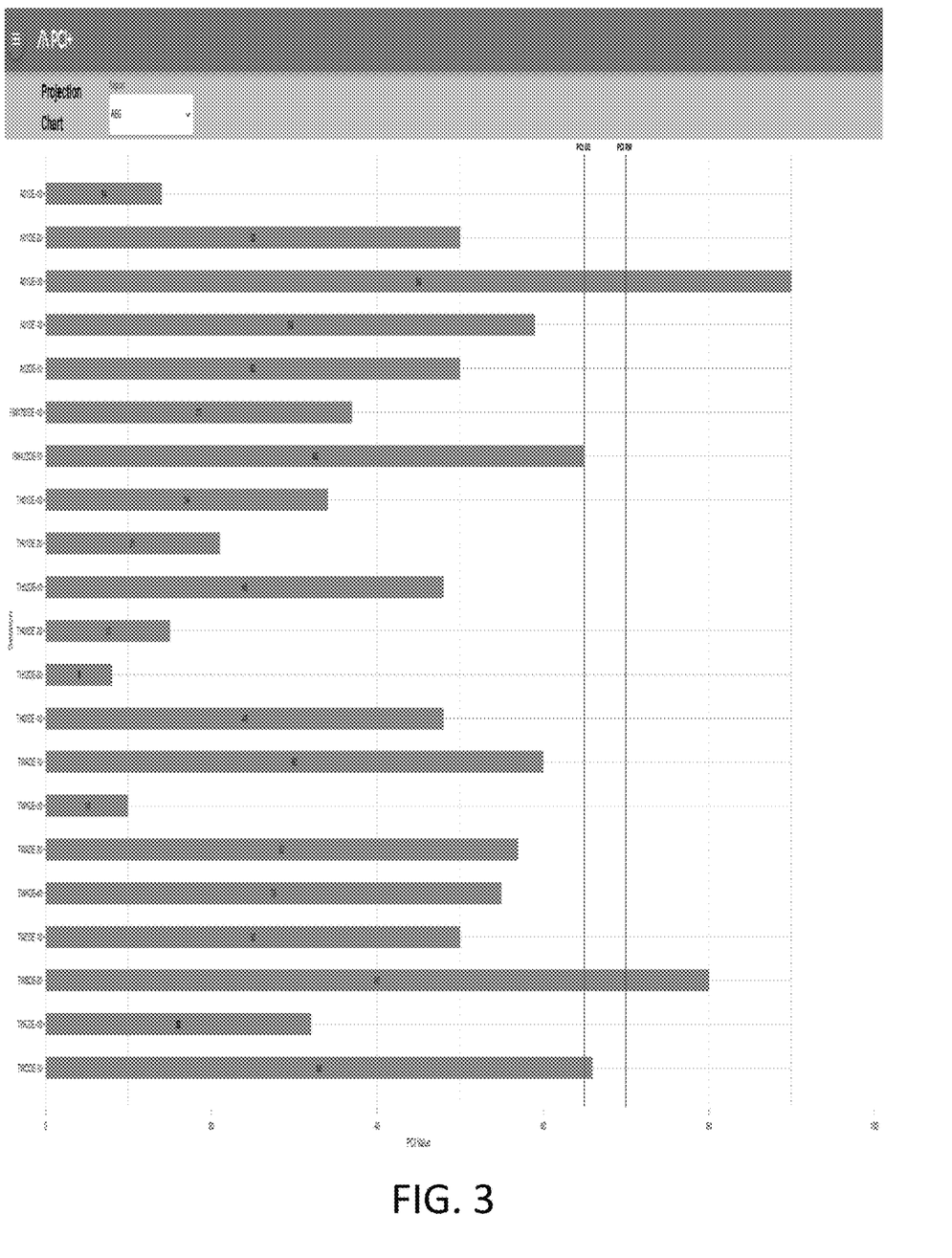
FIG. 3 is an illustration of an example PCI Projection chart produced by an example embodiment and placed into a software application dashboard.
Figure 7:
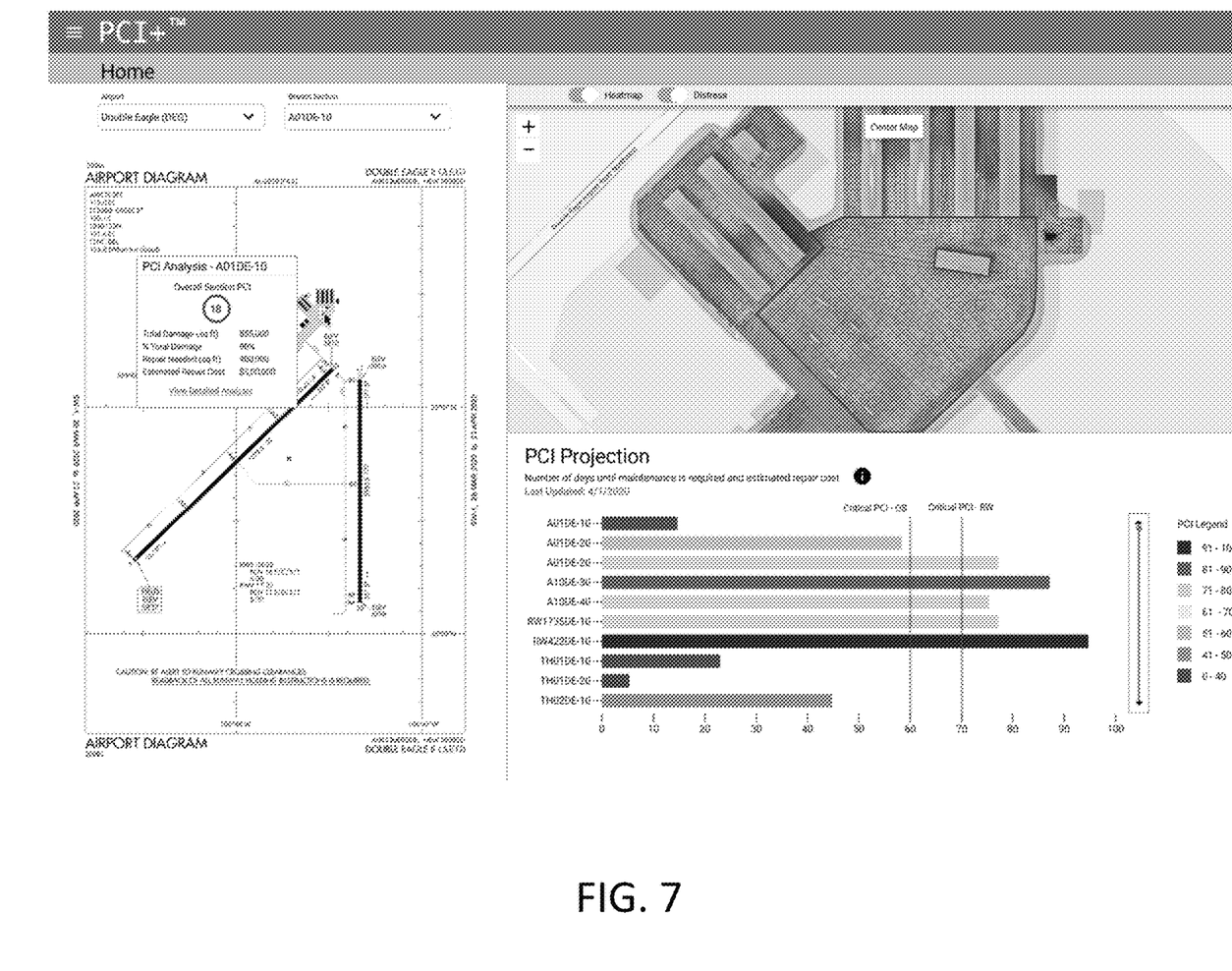
FIG. 7 is an illustration of a projection chart which includes a visual, color-coded legend with PCI range values.

FIG. 1 is an illustration of an example software application login screen for the described invention. In order to access the application, users must have authenticated credentials with a an email address and password. FIG. 2 is an illustration of an example PCI image produced by example embodiment and placed into a software application. The image shows a graphical illustration of an overall runway complex footprint, presented with a color-coded representation. FIG. 3. is an illustration of a PCI projection chart indicating when the PCI of each pavement section will reach Critical PCI. FIG. 7 illustrates the projection chart which includes a visual, color-coded legend with PCI range values. This allows easy comprehension of the overall state of the runway pavement section as well as facilitates rapid identification of other pavement areas that need attention.

In the application, a user can navigate within the interactive pavement map to obtain more information about individual pavement sections. For example, FIGS. 3 and 7 contain a toolbar located within the pavement map in which a user can control visible map options such as the heatmap and enhanced distress layers. When a user clicks on a pavement section, additional information such as PCI value and other defect attributes will become visible. The user can also zoom in, zoom out, and pan within the map to further inspect different areas of interest for a selected pavement section or overall airport footprint area. Furthermore, a user can navigate to the PCI Projection Chart feature within the application, which displays the current PCI values for each pavement section, the remaining number of days until each section reaches Critical PCI levels, and the associated PCI Legend which corresponds to the different PCI colors as defined in the ASTM D5340 standard. Conversely, if a section has reached Critical PCI, the user can see how many days have passed since the initial date of reaching Critical PCI. There are two Critical PCI values: one for airport runway surfaces and the other for non-runway surfaces. The PCI Projection Chart is a valuable tool in the assessment of pavement repair planning and budgeting, as well as providing an evidence-based method to track the pavement lifecycle on airports.

The presentation of results as depicted in FIGS. 1, 2, and 3 can be implemented on computer systems known in the art, using programming techniques and libraries known in the art. The software application comprises the following components: tileserver, database, application programming interfaces (APIs), and a frontend. The tileserver comprises georeferenced raster tiles that are displayed on the application frontend. The database contains all data pertaining but not limited to a user account, organization, PCI, airport data. The APIs serves as the data transfer mechanism between the tileserver and database to the application frontend for end-user access. The software application can be created with a combination of programming technologies, libraries, frameworks, and techniques such as JavaScript, C#, React, Python, AWS DynamoDB and more.

The software application is also secured by authentication, security, and data management protocols. In order for a user to access pavement and PCI data, they must be authenticated through a security provider. The application may be deployed on an on-site, local server or a cloud hosting provider. Performance and security components such as monitoring, optimization, and scalability of the application are also managed by a cloud hosting provider. Users can access the application using a tablet, laptop computer, desktop computer, or a mobile device. Any associated data for a user, account, organization, or pavement is managed through cloud storage providers.

Figure 4:
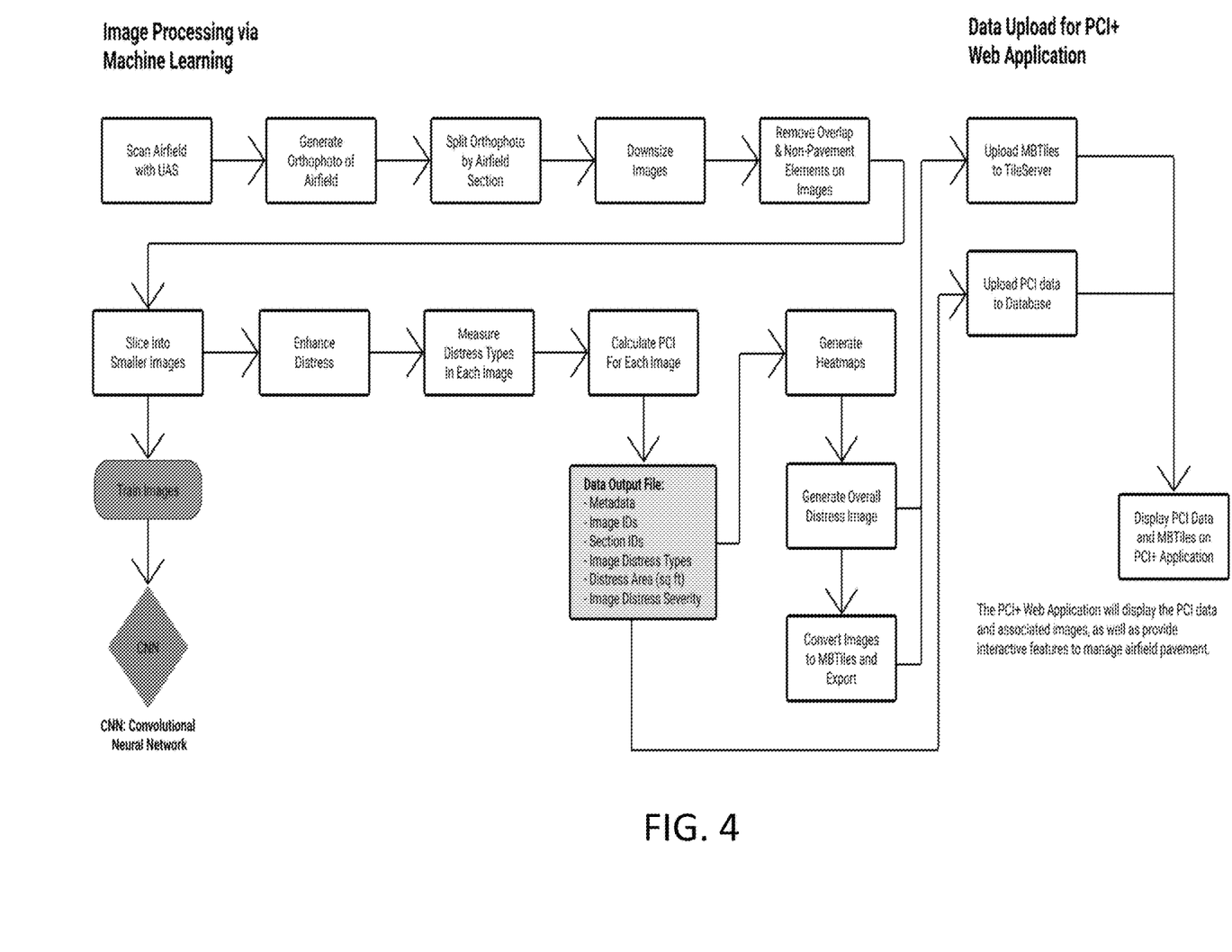
FIG. 4 is a schematic illustration of the steps of a method according to the present invention.

FIG. 4 represent a schematic illustration of the steps of a method according to the present invention. An initial step comprises collecting information concerning the status of the pavement. This can be done by data collection methods such as aerial imaging of the runway complex by using a drone or unmanned aircraft with appropriate imaging systems such as visual light cameras and sensors such as LiDAR. Other imaging systems can be used, alone or in combination with visual light cameras or each other, such as infrared imagers, spectroscopic imagers, radar, ground-penetrating sensors, etc. The use of other imaging systems can facilitate automated assessment of pavement condition in some applications. Georeferenced images of airport pavement are collected from at least one UAS. The data collection method requires the creation of a mission plan, using flight planning software tools. To acquire georeferenced images with approximately 0.29 to 1 cm per pixel GSD, the following specifications can be configured into a mission plan:

Rectangular flight mode for the UAS

75' altitude

Data capture at a speed of 11 mph

70% front overlap

75% side overlap 90-degree Gimbal Pitch

Dual Grid for runway scans, Single Grid for taxiways and ramps

Overlap of individual scans at least 10'

Camera resolution 4000/3000, JPG, shutter 1/15, ISO 200

Flight plans capture at least 5' of turf on either side of pavement

Deconfliction of 25' between multiple drones. #1=100', #2=125', #3=150', #4=175', etc.

The mission plans are configured through a flight planning software tool that can be compatible with mobile or tablet devices such as an Apple iPad for convenience. Before each scan, each pilot or their designated representative can complete a Compass and IMU calibration. The flight planning software is then used by a pilot to launch the UAS according to the pre-configured mission plan. Once the mission is complete, the resulting data can be recorded and stored on SD cards.

Figure 5:
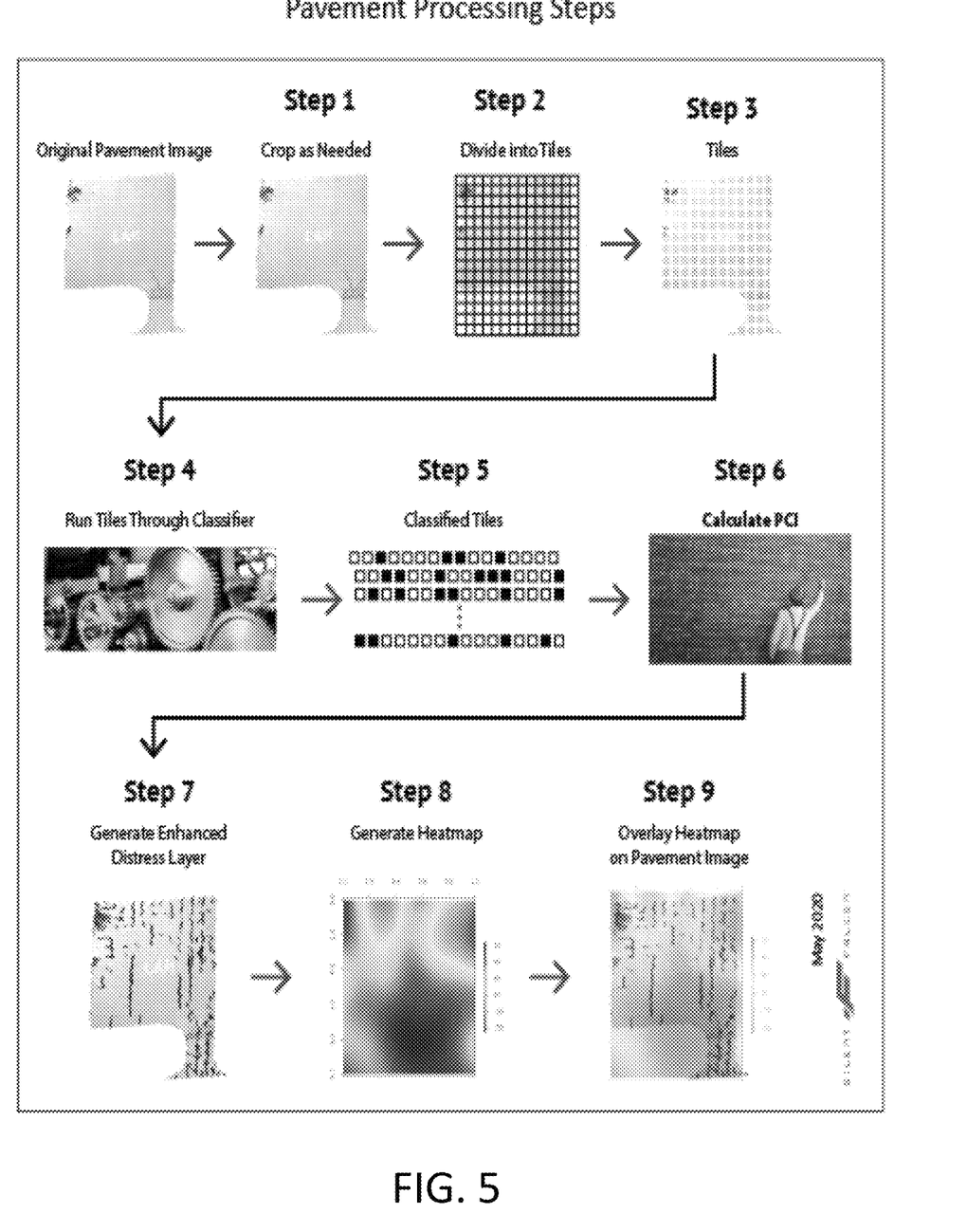
FIG. 5. Is a schematic illustration of Pavement Image Analysis and Processing steps according to the present invention.

The data captured by any UAS can then be assembled or stitched into an orthomosaic, which can then be divided, for example into relevant sections of the runway complex. Defects or other assessments of pavement condition can then be determined. Orthomosaics are generated through a open-source or licensed photogrammetry software application such as Metashape, DroneDeploy, or Pix4D. To generate an orthomosaic, the data collected by a UAS for a desired airport or pavement network is reviewed for data quality. Images with corrupted files containing characteristics such as distortion, blurriness, and non-pavement images are removed from the dataset. Next, the photos are imported into a photogrammetry software. The following steps are required to create the end orthomosaic of an entire airport: 1) camera alignment, building a mesh, building a digital elevation model (if applicable), building the orthomosaic, exporting the orthomosaic. Next, a GIS software application (i.e. ArcGIS, QGIS, etc) is utilized to crop an overall orthomosaic of an airfield into desired PCI sections according to the parameters in which PCI values need to be calculated. Image compression techniques (i.e. JPEG, Deflate, LZW) may be applied to optimize file size without comprising image resolution quality. Once the individual orthomosaic files have been cropped, the images are prepared for the machine learning steps in the workflow: image classification, PCI computation, and Enhanced Distress Layer generation. FIG. 5 illustrates a defect detection system using machine learning methods. The results of the defect or condition detection can then be used to determine a PCI for each region of an airport and the results presented as discussed in connection with FIG. 2.

An example embodiment of the present invention can comprise a pavement imaging subsystem, an analysis subsystem, and a presentation subsystem. The pavement imaging subsystem can comprise, e.g., an unmanned aerial vehicle (UAV) such as a quadcopter or other rotary wing drone, or a fixed wing drone like the Silent Falcon (trademark of Bye UAS). The UAV can carry one or more imaging devices such as cameras, including one or more of a visible light camera, an infrared sensitive camera, a thermal imager, a radar system, a spectroscopic imager, or other imaging modalities desirable for assessing pavement condition. The UAV can store information collected by the imaging devices on-board the UAV, to be downloaded after landing, or can transmit information collected by the imaging devices to a data collection facility, e.g., a hard disk or other mass storage accessible by the analysis subsystem, or a combination thereof.

The UAV can be controlled by a pilot in real time or can follow a pre-programmed flight path to provide adequate imaging coverage of the pavement system. The pre-programmed flight path would be categorized as autopilot. The UAV flight path can also be adaptive, e.g., the UAV flight path can be changed based on imaging analysis to provide more detailed imaging of areas of the pavement that show signs of deterioration, or that have recently undergone maintenance or repair or encountered unusual events.

FIG. 4 illustrates the steps of the Pavement Processing method according to the present invention. FIG. 5 is an visual representation of the overall pavement processing method. This constitutes the analysis subsystem, which produces integrated images of the overall pavement system from the various images collected by the imaging subsystem. The initial two steps comprise dividing each pavement section into smaller tiles through a programming script. Next, the tiles are analyzed by an image classifier program to identify all 33 types of pavement distresses in accordance to ASTM D5340. In some embodiments, the individual tiles are applied with a small neural network, and in most cases, a Convolutional Neural Network (CNN). The resulting output of the image classifier are classified tiles with the following calculations, but not limited to square footage, location, density, length, and other aspects of distresses in each pavement section. Next, the PCI values are calculated for each section. An Enhanced Distress Layer is then generated through another programming script, which exaggerates the defects to make them appear more visible. This may include boundary lines and patterns drawn on each defect identified on each pavement section.

Figure 6:
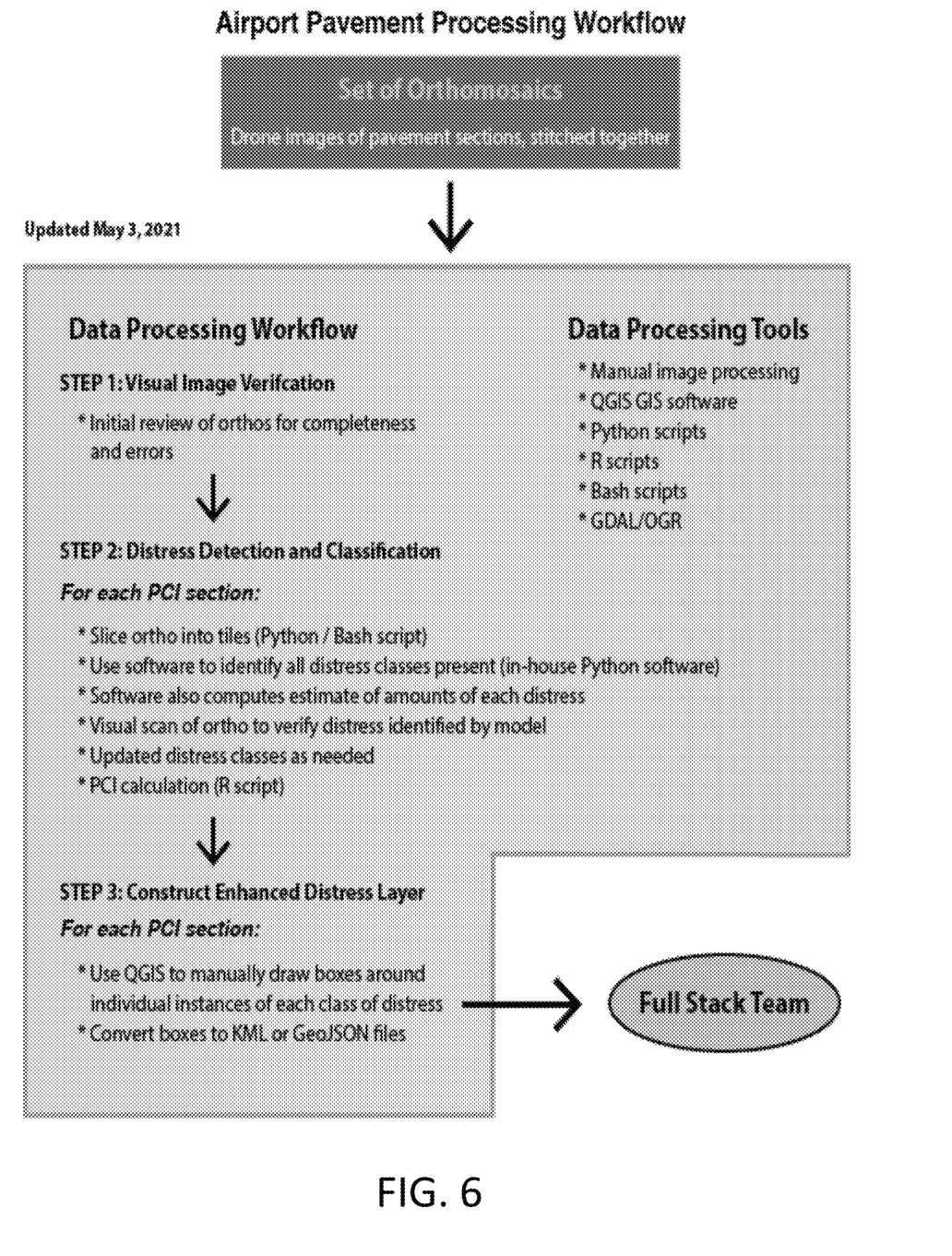
FIG. 6 is a detailed illustration of pavement processing steps according to the present invention.

FIG. 6 illustrates an updated list of written workflow steps for pavement image processing to compute PCI calculations for a pavement branch, section, or network, the enhanced distress layer (EDL) and associated data processing tools involved. This workflow was involves image processing tools and programming techniques comprised of GIS software such as QGIS or ArcGIS, Python, R, Bash, and GDAL/OGR. Additional programming technologies and techniques may be used to achieve the desired output.

A heatmap is generated utilizing a different programming script to visualize different PCI ranges. As a specific example, the Gaussian Kernel Density Estimation algorithm can be applied. The Heatmap is then overlaid on the Enhanced Distress Layer with appropriate opacity and colored pixel values to exemplify the illustration of the base aerial pavement imagery and total square footage area of pavement defects combined.

The presentation subsystem can present information from the analysis subsystem to a user. As examples, the presentation subsystem can present visible images of the pavement system with defect characteristics overlaid, e.g., by the heatmap, where pavement quality of the underlying pavement is indicated by color variation(s) within the pavement image, or by showing the Enhanced Distress Imagery as points such that defect density is apparent by visual inspection of the density of points. The presentation subsystem can also allow a user to zoom in or out to examine the results in varying levels of detail.

An example embodiment can further comprise a storage subsystem, storing information from previous applications of the system to the present pavement system. The analysis subsystem can use the stored information to compare the present images or condition with those from previous applications. The presentation subsystem can use the stored information to present time-based characteristics of the pavement condition, e.g., by allowing a user to select historical data in the display by showing the pavement system at various points in time, allowing visual evaluation of the change or rate of change of the pavement condition; or by presenting the images with color, shading, or other indications of regions of the pavement that show particular change characteristics, e.g., by highlighting regions whose conditions have deteriorated more than the average deterioration for the overall pavement system.

An example embodiment can also comprise a prediction subsystem, configured to determine predicted future pavement condition based on the present condition, previous conditions from the storage subsystem, information concerning usage or environmental or other conditions, information concerning proposed maintenance or repair, or combinations or subsets thereof. The presentation subsystem can present such predicted condition to the user, for example as part of a time-based presentation that scrolls through past conditions to the present, and then into the predicted future.

An example embodiment can also comprise a recommendation subsystem, configured to determine maintenance or repair actions from the determined pavement condition. The recommendation subsystem can use predetermined correlations between pavement condition and recommended maintenance or repair to determine recommendations, and can use image analysis to determine regions of the pavement system that are applicable for such recommendations, e.g., by recommending a certain repair action for a region of the pavement system that has a determined defect characteristic, including regions that might not have such defects but where inclusion would facilitate the repair action (e.g., if a repaving machine has a 20 foot width, then repaving recommendations can indicate 20 foot wide regions for repaving even if less than the full 20 foot width requires repaving). The prediction subsystem can also use inputs from the recommendation subsystem, e.g., to present to the user the predicted future pavement condition assuming completion of various recommended repair or maintenance actions.

The various subsystems can be implemented in general or special purpose computers, using programming techniques well known to those skilled in the art.

In an example embodiment, an unmanned aerial system performs an aerial scan of the pavement periodically, for example once every 90 days. Defects can be determined as described above, and pavement condition index for each relevant region of the pavement determined. Predictions of future pavement condition can be made, e.g., by human users or by automated systems such as in computer software. Maintenance and repair recommendations can be made, and predictions of future pavement condition can be made under different maintenance or repair scenarios. Results can be presented, e.g., at any time of the day or periodically (e.g., monthly), to allow human decision-makers to understand the condition of the pavement and to make decisions concerning maintenance, repair, and usage. Performing maintenance or repair on regions of the pavement that have lower PCI can allow the overall pavement complex to be maintained at a higher average quality condition at lower cost than either waiting until large regions need repair or repairing large regions when only smaller regions are damaged. The present invention's ability to detect actual defects in a complete image of the pavement allows such fine-grained management. Previous state of the art uses only manual inspection of selected samples to generate an average PCI for large regions, and accordingly cannot enable condition assessment and prediction, and targeted repair decisions, at fine enough resolution.

FIG. 3 is a schematic illustration of a process according to the present invention. Digital images of the airport, all or a portion to be inspected, are acquired, for example using a fixed wing drone such as those made by Silent Falcon (a trademark of Bye UAS). The digital images can comprise visible light images such as conventional photographs and can also comprise other images such as infrared sensors. The digital data is then processed as described above to determine characteristics of the pavement, for example to locate pavement defects or surface deterioration. The defect determinations can then be overlaid or otherwise integrated with the visible light images to facilitate inspection and understanding by a human operator. The pavement characteristics can be further processed, e.g., a heatmap of defects determined, an Enhanced Distress Image of defects determined, or thresholds or combinations applied, to further facilitate understanding by a human operator and decision making based on the results.

The present invention has been described in connection with various example embodiments. It will be understood that the above description is illustrative of the applications of the principles of the present invention, the scope of which is to be determined by the claims viewed in light of the specification. Other variants and modifications of the invention will be apparent to those skilled in the art.

We claim:

1. A method of determining and displaying pavement condition of airport pavement, comprising:
    (a) determining an orthomosaic of the airport pavement by scanning the airport pavement with an unmanned aerial system (UAS);
    (b) generating a plurality of subsections of the orthomosaic;
    (c) analyzing one or more subsections to determine a pavement condition index for that subsection;
    (d) displaying to a user a representation of the pavement condition indices determined correlated with a representation of the airport pavement;
    wherein step (a) comprises:
    (a1) causing the UAS to overfly the airport pavement and acquire a plurality of images using a visible light camera, each image corresponding to a section of the airport pavement, where the sections overlap and together represent the entire portion of the airport pavement whose condition is to be determined;
    (a2) using a computer to combine the plurality of images;
    wherein step (a1) comprises causing the UAS to fly a mission comprising the following parameters:
    rectangular flight mode for the UAS;
    75' altitude;
    data capture at a speed of 11 mph;
    70% front overlap;
    75% side overlap;
    90-degree gimbal pitch;
    dual grid for runway scans, single grid for taxiways and ramps;
    overlap of individual scans at least 10';
    camera resolution 4000/3000, shutter 1/15, iso 200;
    images capture at least 5' of turf on either side of pavement.

2. The method of claim 1, wherein step (a1) further comprises acquiring with the UAS a second plurality of images with one or more of the following: LIDAR, infrared imager, spectroscopic imager, radar, ground-penetrating sensor.

3. The method of claim 1, wherein step (c) comprises using a neural network classifier to classify each subsection according to the presence of one or more of 16 types of pavement distresses set forth in ASTM D5340.

4. The method of claim 1, wherein step (d) comprises generating a representation of the airport pavement combining a visual image of the airport pavement with representations of pavement distress at each corresponding location.

5. The method of claim 1, wherein step (d) further comprises determining a forecast pavement condition based on the determined pavement condition and a forecast maintenance schedule, and presenting the forecast pavement condition to the user.

6. An apparatus for determining and displaying pavement condition of airport pavement, comprising:
(a) an unmanned aerial system (UAS), configured to overfly and collect a plurality of images using a visible light camera, each image corresponding to a section of the airport pavement, where the sections overlap and together represent the entire portion of the airport pavement whose condition is to be determined, the UAS further configured to overfly using a mission comprising the following parameters:
rectangular flight mode for the UAS;
75' altitude;
data capture at a speed of 11 mph;
70% front overlap;
75% side overlap;
90-degree gimbal pitch;
dual grid for runway scans, single grid for taxiways and ramps;
overlap of individual scans at least 10';
camera resolution 4000/3000, shutter 1/15, iso 200;
images capture at least 5' of turf on either side of pavement;
(b) an analysis system, configured to assemble subsections of the airport pavement images from the UAS, and to determine a pavement condition index for each subsection;
(c) a display system, configured to display to a user a representation of the airport pavement correlated with the determined pavement condition index for each subsection in the representation.

7. The apparatus of claim 6, further comprising a prediction system configured to determine a predicted pavement condition from the determined pavement condition and a forecast maintenance schedule, and wherein the display system is further configured to display to the user the predicted pavement condition.

8. The apparatus of claim 7, wherein the prediction system is further configured to determine a predicted pavement condition from the determined pavement condition and a forecast maintenance schedule and a forecast usage schedule.

* * * * *